United States Patent [19]

Tzanet et al.

[11] Patent Number: 5,291,854
[45] Date of Patent: Mar. 8, 1994

[54] BIODEGRADABLE BIRD FEEDER

[75] Inventors: Louis Tzanet, Montreal; André Obidniak, Dollard des Ormeaux, both of Canada

[73] Assignee: Birds for Tomorrow Reg'D., St.-Laurent, Canada

[21] Appl. No.: 41,858

[22] Filed: Apr. 2, 1993

[51] Int. Cl.⁵ .................................................. A01K 39/00
[52] U.S. Cl. .................................................. 119/52.2
[58] Field of Search ............... 119/52.2, 52.3, 52.4, 119/53.5, 54; 222/96, 93, 564, 545, 547, 526, 527, 535

[56] References Cited

U.S. PATENT DOCUMENTS

| | | | |
|---|---|---|---|
| 1,916,230 | 7/1933 | Murray | 119/52.4 |
| 1,940,010 | 12/1933 | Murray | 119/52.4 |
| 2,556,661 | 6/1951 | Rendall et al. | 119/52.1 X |
| 2,556,707 | 6/1951 | Rendall et al. | 119/52.1 X |
| 2,746,665 | 5/1966 | Wiggins | 119/52.1 X |
| 2,891,711 | 6/1959 | Early | 119/52.2 X |
| 3,763,826 | 10/1973 | Portelli | 119/52.1 |
| 4,233,941 | 11/1980 | Webster | 119/52.2 |
| 4,570,575 | 2/1986 | Hinz | 119/52.2 |
| 4,989,548 | 2/1991 | Short et al. | 119/52.2 |

*Primary Examiner*—Gene Mancene
*Assistant Examiner*—Thomas Price

[57] ABSTRACT

A bird feeder comprised of an enclosure having a roof structure with access to permit the placement of bird seeds in the enclosure. One or more feeding ports are provided in a side wall of the enclosure adjacent a bottom wall thereof. The feeding ports have a detachable closure. An exterior bird support member is provided below each of the feeding ports. An internal partition device is disposed in the enclosure and positioned inwardly and inclined to the feeding ports and has a discharge opening for discharging seeds from the inside of the enclosure to an internal feeding area adjacent the feeding ports.

11 Claims, 3 Drawing Sheets

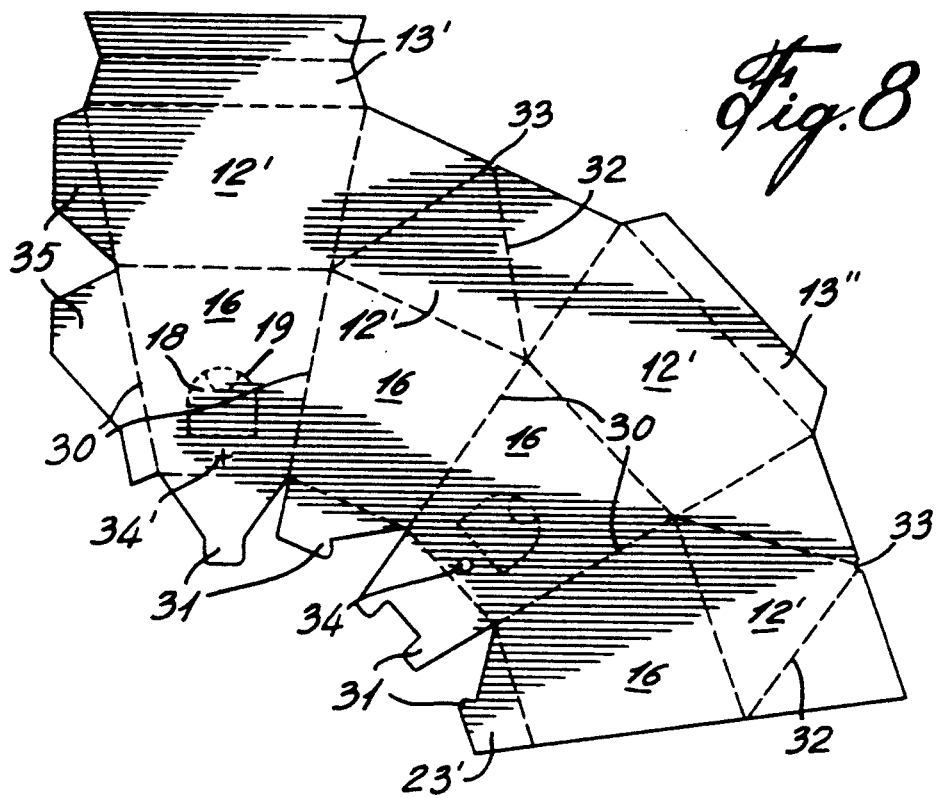
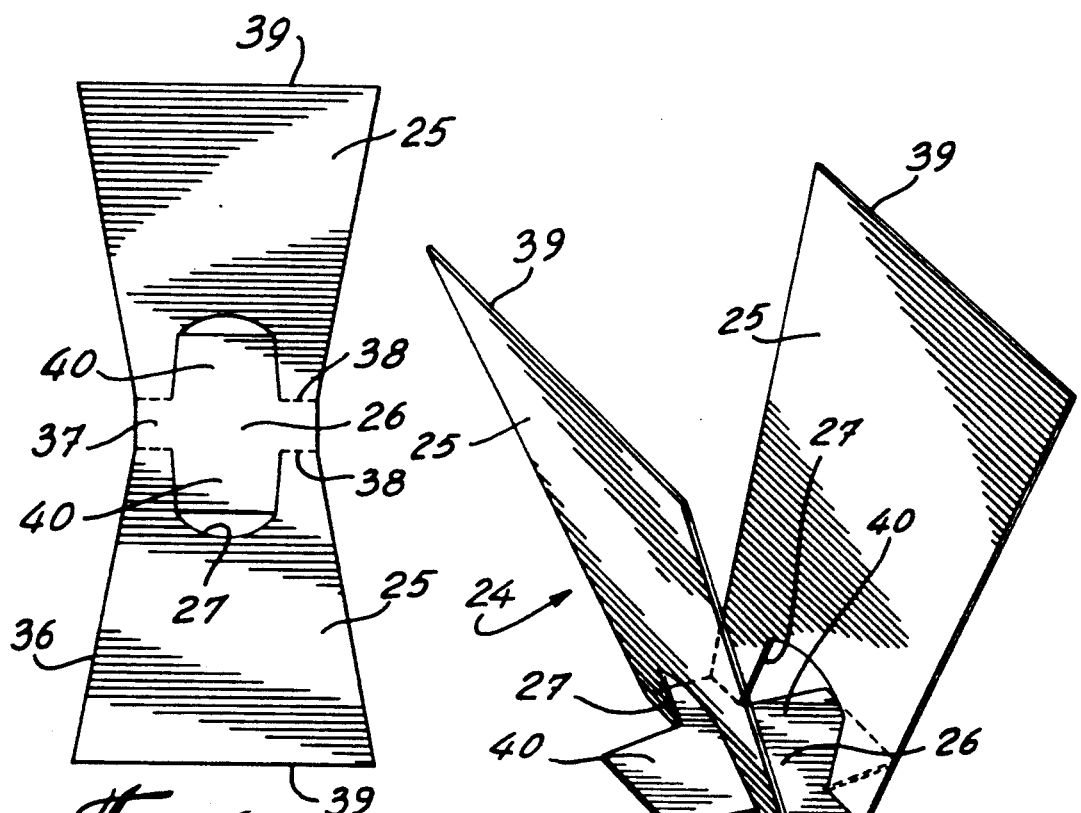

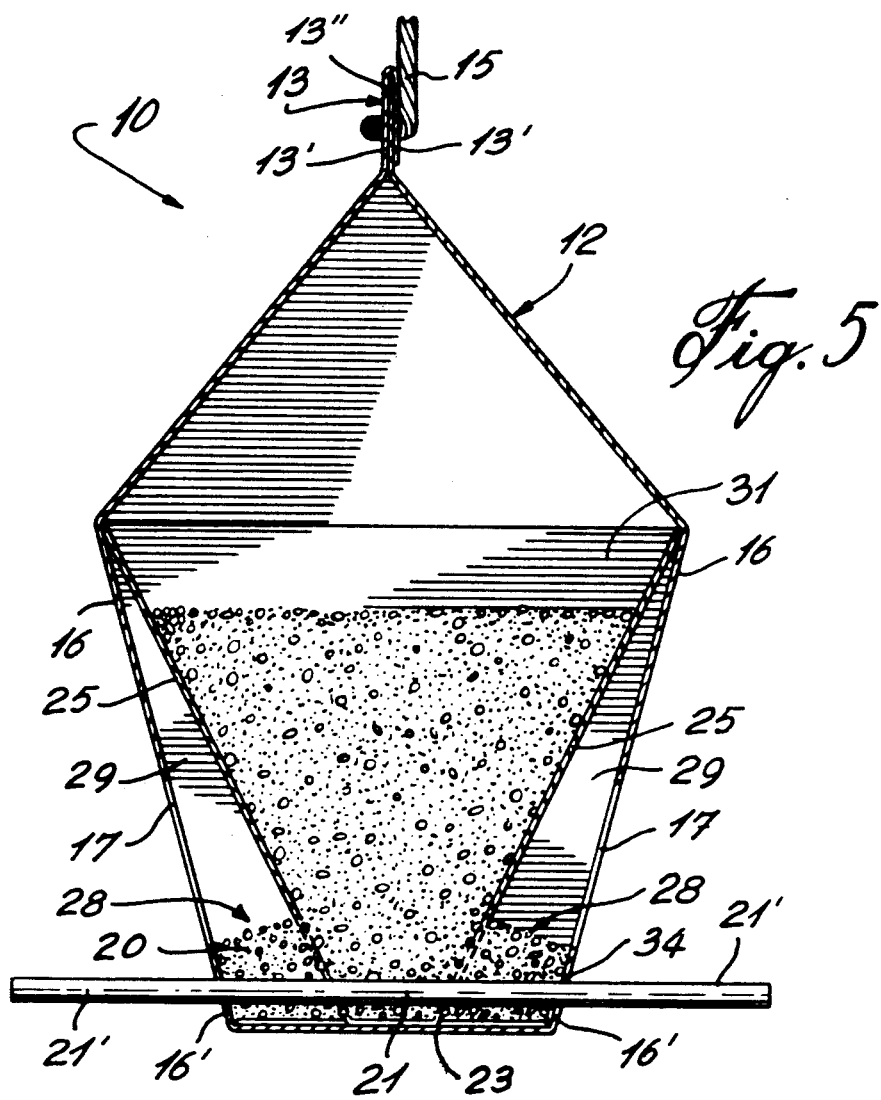
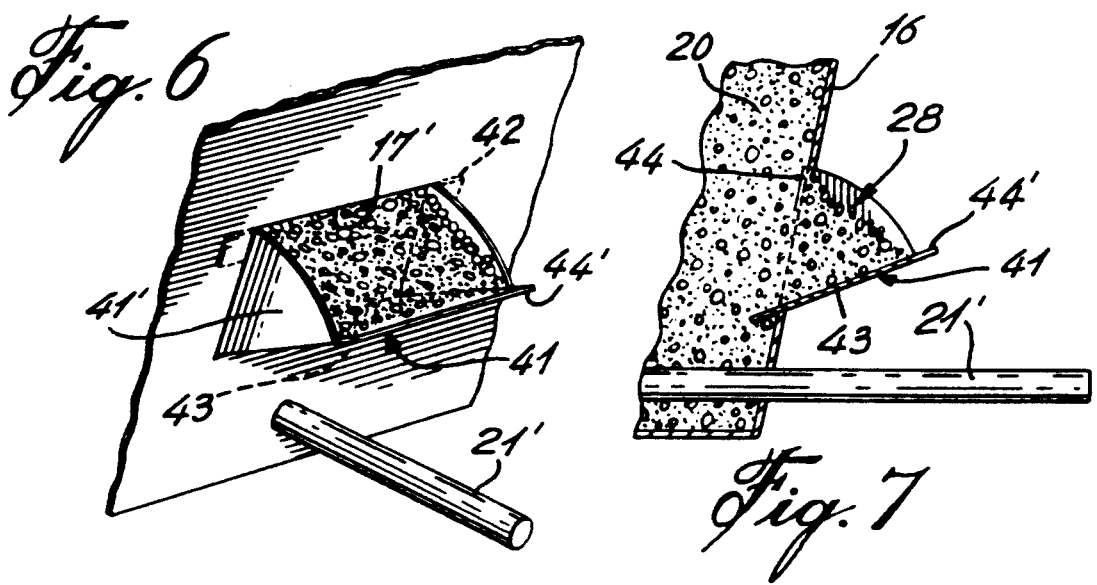

BIODEGRADABLE BIRD FEEDER

BACKGROUND OF INVENTION

1. Field of the Invention

The present invention relates to a bird feeder which is constructed of biodegradable material and filled with bird seeds with the feeding ports of the bird feeder being closed by detachable closures and wherein internal partitions provide for bird seeds to be discharged internally of the enclosure to a feed area adjacent the feeding ports.

2. Description of Prior Art

Various bird feeders are known, but the majority of these are constructed of rigid material capable of weather resistance, such as wood, metals, plastics, etc. and many have a removable roof structure which permits the insertion of seeds in the housings. Most bird feeders are sold without the bird seeds in them as the feeding ports of the housings are usually open and therefore the housing could not hold the seeds.

There is a need to provide a new type of bird feeder which is constructed of a biodegradable material, such as cardboard, and wherein the bird feeder is formed as an enclosure with one or more feeding ports which are provided with detachable closure means whereby the housing may be filled with bird seeds, at the point of sale.

SUMMARY OF INVENTION

According to a feature of the present invention, there is provided a bird feeder which is constructed entirely of biodegradable materials and wherein the feeder can be filled with seeds, at the point of sale, with the bird feeding ports being closed by detachable closure means.

Another feature of the present invention is to provide a bird feeder comprising an enclosure having an access means in its roof structure for the placement of seeds therein, and removable partition means inside the enclosure so that the bird seeds can be discharged inside the enclosure at an internal feed area adjacent the feeding ports.

Another feature of the present invention is to provide a bird feeder constructed of biodegradable material and wherein the exterior surface of the bird feeder has printing thereon made of biodegradable ink.

According to the above features, from a broad aspect, the present invention provides a bird feeder which is comprised of an enclosure having a roof structure. Access means permits the placement of bird seeds in the enclosure. One or more feeding ports are provided in a side wall of the enclosure adjacent a bottom wall thereof. Removable closure means is provided for closing the ports. Exterior bird perching means is provided below each of the feeding ports. Seed dispensing means is associated with each of the feeding ports to provide seeds to a feed area adjacent the feeding ports.

BRIEF DESCRIPTION OF DRAWINGS

A preferred embodiment of the present invention will now be described with reference to the accompanying drawings in which:

FIG. 3 is a perspective view of the internal partition means disposed inside the enclosure;

FIG. 4 is a plan view of the blank forming the internal partition means;

FIG. 5 is a section view through the housing showing the position of the partition means and the distribution of the bird seeds adjacent the feeding ports;

FIG. 6 is a perspective view illustrating an alternative construction of the detachable closure means of the feeding ports;

FIG. 7 is a fragmented side view showing the feeding port of FIG. 6 in its open feeding position; and FIG. 8 is a plan view of the blank forming the bird feeder enclosure of the present invention.

DESCRIPTION OF PREFERRED EMBODIMENTS

Figure 1:
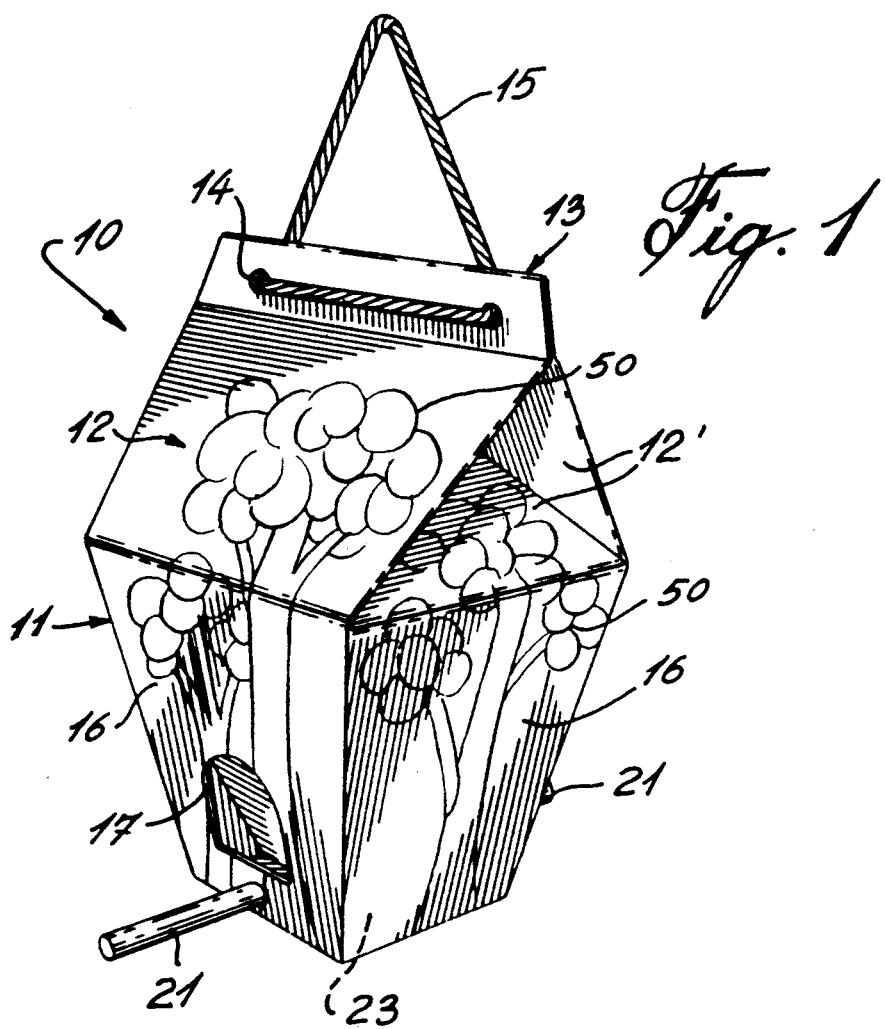
FIG. 1 is a perspective view of a bird feeder constructed in accordance with the present invention.

Referring now to the drawings, and more particularly to Figure 1, there is shown generally at 10, the bird feeder of the present invention. It is comprised of an enclosure 11 having a roof structure 12 formed of interconnected panels 12' which are secured by a detachable flap 13. As shown in FIG. 5, the detachable flap may consist of opposed narrow panels 13' and an internal connecting panel 13" interconnected together by fastening means, such as glue or rivets 14 or staples (not shown), etc. Suspension means in the form of a cord 15 of biodegradable material supports the bird feeder 10 suspended.

The enclosure 11 is herein shown as having opposed flat rectangular side wall panels 16 but it is conceivable that the side wall may also have other shapes including being formed as a cylinder. One or more feeding ports 17 are provided in opposed side wall panels 16 or in a cylindrical side wall in opposition to one another. Detachable closure means in the form of a removable wall 18 (see FIG. 4) having peripheral perforations 19 seals the feeding port until the bird feeder is ready to be used. The reason for the closure means is that the bird feeder is filled with bird seeds 20 whereby when the bird feeder is purchased, there is no need to have to load the bird feeder with seeds. It is simply necessary to remove the perforated detachable wall 18 from the feeding ports 17.

Figure 2:
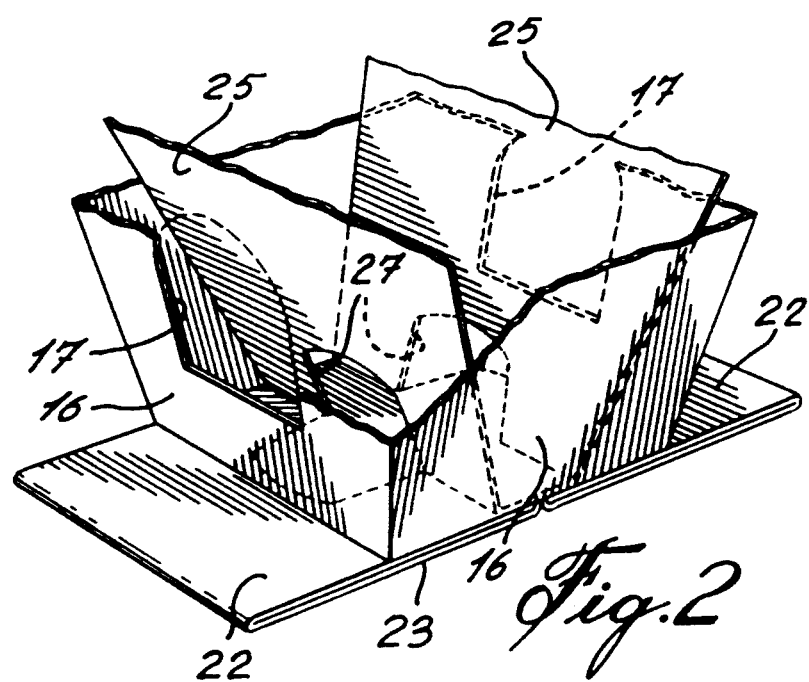
FIG. 2 is a fragmented perspective view showing an alternative construction of the bird support means below the feeding ports of the enclosure.

A bird perching post 21 is provided below each of the feeding ports 17. Alternatively, the bird support may be provided by a perching or support platform 22, as shown in FIG. 2, formed with the bottom wall 23 of the enclosure 11. As shown in FIG. 2, the feeding ports 17 are spaced above this ledge or post so that birds can perch to feed.

In order to prevent bird seeds from falling out of the enclosure 11 by gravity, there is further provided, with additional reference to FIGS. 3 to 5, an internal partition structure generally shown at 24 in FIG. 3. This structure, as shown in FIG. 4, is formed from a flat blank of cardboard material and consists of a pair of opposed inclined guide walls 25 and an alignment base wall 26. The base wall is dimensioned such as to abut with tapered side wall portions 16', as shown in FIG. 5, of the enclosure adjacent the bottom wall 23 thereof. As shown in FIG. 5, the inclined guide walls 25 are disposed inside the enclosure and spaced inwardly from a respective one of the feeding ports 17. The inclined guide walls 25 are further provided with discharge openings 27 for discharging the bird seeds 20 from inside the enclosure to an internal feed area 28 adjacent the feeding ports 17 and extending to the bottom portion of the space 29 defined between the enclosure side wall 16 and the inclined guide wall 25. It is conceivable that the partition walls can be modified to achieve the same objective of discharging the seeds in the feed area.

As shown in FIGS. 1 to 5, the enclosure 11 has inwardly tapered side walls 16 and the enclosure roof structure side wall and bottom wall are all formed from a single blank of a sheet of foldable material, such as cardboard, as is illustrated in FIG. 8. As herein shown, the blank defines the four side wall panels 16 and these are of identical configuration. Each of the side wall panels 16 have inwardly tapered side edges 30 such that when the side wall panels are folded to form the enclosure 11, there is defined a conical-shaped inner chamber 31 of square cross-section. The bottom wall 23 is formed from bottom wall panels 23' each provided with integrally formed interconnecting panels 31 in the form of connecting tabs and slots, as is well known in the art. Connecting tabs 35 are also formed adjacent the end edge of one of the side wall panels 16 or the roof structure panels 12' to interconnect the panels to form the enclosure. The interconnection can be made of biodegradable glue or other suitable securement means.

The roof panels 12' are formed with crease lines 32 so that they can fold in the configuration as shown in FIG. 1. The side panels 12' are further formed with a small arcuate groove 33 at the end of the crease lines 32 to facilitate folding and to prevent buckling. As also shown in FIG. 8, a hole 34, or simply transverse slits 34', provide for an opening for the placement of the bird support rod 21, as shown in FIG. 5. As shown in FIG. 5, a single wooden rod extends through opposed side walls 16 of the housing, through the holes 34 and through the discharge openings 27 of the inclined guide walls. This rod is of selected length whereby opposed exterior end portions 21' extend below the feed ports so that birds may perch thereon to feed.

Referring again to FIG. 4, the blank forming the internal partitions defines guide walls with inclined inwardly tapered side edges 36. The inclined guide walls 25 are also interconnected through a narrow rectangular bottom wall 37. Straight parallel fold lines 38 interconnect the guide walls 25 together. The guide walls 25 also have a straight top edge 39. The discharge opening 27 is also cut to each side of the bottom wall 37 and defines a spacing tab 40 formed integral with the bottom wall 37 and extending in a common plane therewith when in its position of use, as shown in FIG. 3. These tabs 40 and bottom wall 37 constitute means to retain the guide walls 25 at an inclined position within the bird feeding enclosure. The guide walls 25 are also dimensioned to extend across a pair of opposed side walls 16, and these are the side walls which do not have the feeding ports.

Referring now to FIGS. 6 and 7, there is shown an alternative construction of the seed dispensing means and the removable closure means for closing the feeding ports 17. As herein shown, the feeding ports 17' are of rectangular configuration and the closure means is a hinge closure means 41 which is formed as a hinge spout formed with opposed side walls 41' and a front wall 43. The spout is very wide and provided with internal retention means, such as flanges 44 to prevent it from hinging out of the opening 17' too far. The seeds inside the enclosure are prevented from falling out of the feed post 17' by the spout 41. Accordingly, there is no need to provide the internal partitions and the feeder may contain more seeds. However, there would remain seeds in the bottom of the feeder which will not be accessible to the birds through the spouts. A stopper extension lip 44' is also provided in the top end of the front wall to arrest the spout in its closed position against the front wall 16 of the enclosure. At the point of sale, an adhesive tape may be provided across the spout to prevent it from opening. In its position of use, the spout is hinged to an open position, as shown in FIG. 7, and a bird can therefore have access to the seeds 20 disposed in the feeding area 28. If one needs to replenish the housing with bird seeds, the roof structure is opened and bird seeds are placed within the enclosure, and the spout 41 may be closed to prevent seeds from falling out during the filling operation.

The enclosure exterior surface may be provided with printing thereon, such as leaf patterns 50, to blend in with the bush environment, or may have various coloured flowers printed thereon, and preferably, the ink utilized is a vegetable ink. The bird feeder of the present invention is also constructed of cardboard, which is also biodegradable and recyclable. This material is also preferably treated with a water-based varnish which is also biodegradable, such that the bird feeder can last for a period of approximately one year under severe climatic conditions, such as those encountered in Canada. The bird feeder, if left suspended in trees, will also act as a bird house for the birds to nest for a single season and this will occur if the bird feeder is not replenished with bird seeds in the spring season. After the harsh winter conditions, the bird feeder will collapse and biodegrade over time. The feeder is thus non-polluting and friendly to the environment.

It is within the ambit of the present invention to cover any obvious modifications of the examples of the preferred embodiment described herein, provided such modifications fall within the exclusive rights as defined by an interpretation of the claims appended hereto.

We claim:

1. A bird feeder comprising an enclosure having a roof structure and at least two opposed inwardly tapered side walls, access means permitting the placement of bird seeds in said enclosure, a feeding port in each said tapered side wall of said enclosure adjacent a bottom wall thereof, removable closure means for closing said feeding ports, exterior bird perching means below each said feeding port, and seed dispensing means associated with each said feeding port to provide seeds to a feed area adjacent said feeding ports, said seed dispensing means being provided by a pair of opposed inclined guide walls disposed inside said enclosure across other opposed side walls and spaced inwardly and inclined to said tapered side walls adjacent said feeding ports and having a discharge opening for discharging seeds from inside said enclosure to an internal feed area on said bottom wall adjacent said feeding ports, said discharge opening being defined by opposed openings formed in each of said inclined guide walls adjacent a narrow rectangular bottom wall, a spacing tab formed with said bottom wall and extending in a common plane therewith and disposed adjacent a respective one of said opposed openings, said tabs and said narrow bottom wall retaining said inclined guide walls at an inclined position.

2. A bird feeder as claimed in claim 1 wherein said enclosure is formed from a single blank of a sheet of foldable material and defines four side wall panels of identical configuration, each of said side wall panels having inwardly tapering side edges such that when said side wall panels form said enclosure, there is defined a conical-shaped inner chamber of square cross-section.

3. A bird feeder as claimed in claim 2 wherein said bottom wall and roof structure are formed by wall and roof panels integrally formed and interconnected with said side wall panels through fold lines.

4. A bird feeder as claimed in claim 3 wherein said bottom wall panels are provided with integrally formed interconnecting means.

5. A bird feeder as claimed in claim 3 wherein said roof panels are provided with closure retention and attachment flaps.

6. A bird feeder as claimed in claim 1 wherein said access means is provided by said roof structure being formed of panels secured by detachable connection means, said detachable connection means providing access to the inside of said enclosure from a top end thereof.

7. A bird feeder as claimed in claim 1 wherein said feeding ports are provided with detachable panels having a perforated contour for the removal of same to form a feeding port opening.

8. A bird feeder as claimed in claim 1 wherein said exterior bird perching means is provided by a rod extending across opposed side walls of said enclosure and spaced below opposed ones of said feeding ports, said rod having end portions extending outwardly of said enclosure below each said opposed feeding ports.

9. A bird feeder as claimed in claim 1 wherein said exterior bird perching mean sis provided by a ledge platform formed with said bottom wall of said enclosure, said feeding ports being spaced above said ledge, there being a ledge below each said feeding ports.

10. A bird feeder as claimed in claim 1 wherein there is further provided suspension means secured to said roof structure to suspend said enclosure.

11. A bird feeder as claimed in claim 1 wherein at least said bird feeder enclosure and partition means are constructed of biodegradable cardboard material which is treated with a water-based varnish, said enclosure having an exterior surface which is provided with printing thereon, said printing being made of a vegetable ink.

* * * * *